No. 685,927. Patented Nov. 5, 1901.
R. P. McNUTT.
NUT LOCK.
(Application filed Dec. 7, 1900.)
(No Model.)
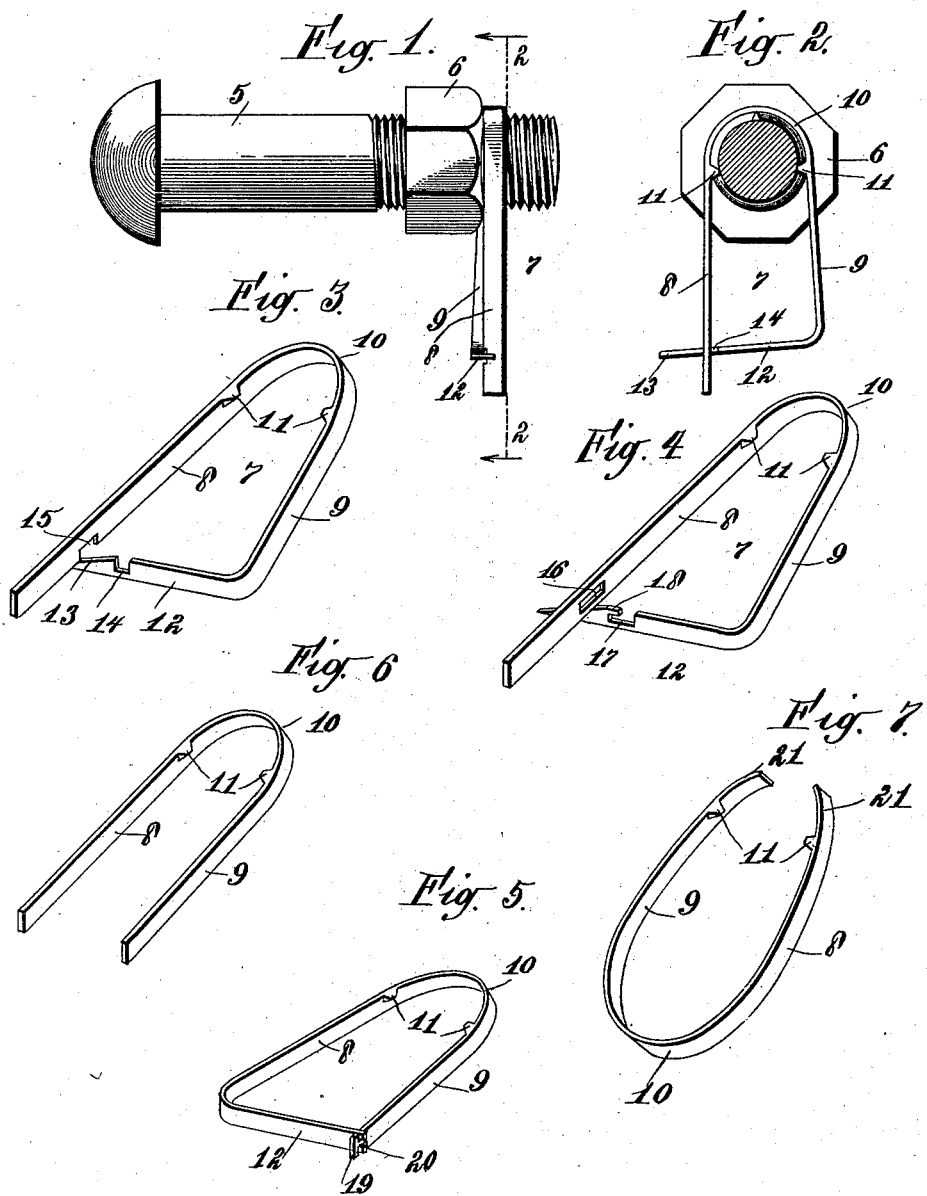
Witnesses:
J. C. Groat
N. H. Bernhard
Robert P. McNutt, Inventor
By Marion & Marion
Attorneys

UNITED STATES PATENT OFFICE.

ROBERT PINKERTON McNUTT, OF PUGWASH, CANADA.

NUT-LOCK.

SPECIFICATION forming part of Letters Patent No. 685,927, dated November 5, 1901.

Application filed December 7, 1900. Serial No. 39,111. (No model.)

*To all whom it may concern:*

Be it known that I, ROBERT PINKERTON MC-NUTT, a subject of Her Majesty the Queen of Great Britain, residing at Pugwash, county of Cumberland, Province of Nova Scotia, Canada, have invented certain new and useful Improvements in Nut-Locks; and I do hereby declare that the following is a full, clear, and exact description of the invention, such as will enable others skilled in the art to which it appertains to make and use the same.

My invention relates to improvements in nut-locks; and one object that I have in view is to provide simple and efficient means adapted for use in connection with any kind of a bolt and serving to retain the nut against working loose on the bolt and from becoming detached accidentally therefrom.

A further object of the invention is to provide a nut-retainer which shall be noiseless and efficient in its action, capable of easy and quick application to and removal from the bolt, which will dispense with the employment of extra or special tools in applying or removing the device to or from the bolt, and which will secure a maximum degree of efficiency in the practical service of the article.

Further objects and advantages of the invention will appear in the course of the subjoined description, and the novelty in the construction and arrangement of parts will be defined by the claims.

In the drawings hereto annexed, forming a part of this specification, Figure 1 is a view of an ordinary bolt and a nut with my improved retainer applied thereto in operative relation to the nut. Fig. 2 is a cross-section through the bolt on the dotted line 2 2 on Fig. 1 looking in the direction of the arrow and showing the retainer in elevation. Fig. 3 is a detail perspective view of the retainer. Fig. 4 is another perspective view of a modified form of retainer shown by Fig. 3. Figs. 5, 6, and 7 are perspective views of other forms of the retainer.

The same numerals of reference denote like parts in each of the several figures of the drawings.

5 designates an ordinary bolt, and 6 an ordinary nut, both of these parts being of any style or size known to or approved by those skilled in the art to which this invention relates.

7 designates the retainer of my invention, the same being peculiarly constructed for application to and engagement with the bolt in a position to offer an obstruction to the nut when the latter works loose, whereby the retainer does not have locking engagement with the nut; but it does have interlocking connection with the bolt, so as to afford a barrier to the nut from working loose on the bolt. Said retainer may be made in either of the various ways shown by Figs. 3 to 7, inclusive, of the drawings; but the retainer consists, essentially, of a spring-metal clip bent to afford a loop or bight at one end and provided with inwardly-extending lips or spurs, whereby the bight may snugly hug the bolt and the lips or spurs be fitted in the channel formed by the screw-thread on the bolt.

In the embodiment of the retainer shown by Figs. 1 to 3, inclusive, it is bent from a single strip or length of spring metal to form the members 8 9 and the bight or loop 10. This bight is curved approximately to the arc of the bolt, while the members in the non-applied condition of the retainer spread or diverge, substantially as shown by Fig. 3. Each member is provided with an inwardly-extending spur or lip 11, the same being struck up or made integral with the metal, and the lips on the two members occupy similar positions at short distances from the bight 10. These spurs are equal to the depth of the groove formed by the thread on the bolt, and when the members are drawn together by compression of the retainer said spurs enter the thread-groove, so as to frictionally engage with the thread, and thereby prevent the retainer from pulling accidentally off the bolt.

I prefer to provide means for detachably interlocking the members of the retainer when the latter shall have been applied to the bolt, and to this end the member 9 is formed with an inwardly-extending arm 12, the same having a beveled extremity or nose 13 and a notch 14. The other member 8 of the retainer is formed in one edge thereof with a notch 15, which is positioned for the arm to enter the notch in order that the two members may be interlocked removably by the engagement of the notched portions thereof.

To apply the retainer in operative position on the bolt, the members 8 9 are spread or separated, so as to allow the retainer to be adjusted in position for the bight 10 to fit around the bolt. This brings the spurs 11 into position to fit in the groove formed by the bolt-thread and to occupy positions below the axis of the bolt, as clearly shown by Fig. 2. The members of the retainer are now pressed together for the beveled ends 13 to pass through the notch 15 and for the notched portion of the arm 12 to engage with the notched portion 15 of the member 8. The two members of the retainer are thus connected detachably by an interlocking joint for the purpose of firmly holding the retainer on the bolt and make the spurs or lips keep their places between the bolt-threads. The retainer extends for some distance beyond the bolt, so that it may engage either with the foot or the head of the rail or with some other obstruction that serves to prevent the retainer from turning out of position on the bolt, whereby the nut will be held against turning on the bolt or disconnection therefrom, because the retainer offers an obstruction or lock to the movement of said nut.
By providing the inclined portion 13 it will be readily understood that while the spurs 11 (being located on the same edge of the strip and normally in the same vertical plane) prior to the locking of the strip in position will freely enter the threads on opposite sides of the bolt in a position where the opposite edge of the strip will substantially contact with the face of the nut when the end of the strip passes over the inclined surface, said spurs will be forced out of their normal plane, as will the vertical portions of the strip, thereby causing the spurs to move in a direction corresponding to the axis of the bolt, so that the spurs will be frictionally engaged with the threads. In this position, therefore, the opposite edges of the strip may be said to have a frictional engagement with the threads and the face of the nut, respectively.

The modification illustrated by Fig. 4 contemplates the provision of a slot 16 in the retainer member 8 instead of the notch 15, as shown by Fig. 3, and the arm 12 of the retainer member 9 is arranged to pass under the slotted portion of the member 8. Furthermore, the arm 12 has a notch 17, which is peculiarly shaped to produce the overhanging lip 18, that enters the slot in the member 8 and engages with the latter in such a way as to afford security to the interlocking connection between the members.

The embodiment represented by Fig. 5 contemplates the provision of a T-shaped head 19 on the extremity of the retainer member 9, with which head is adapted to engage the notched end 20 of the arm 12, which forms a part of the retainer member 8. It will be noted that the arm 12 is adapted to have practically a flush engagement with the retainer member 9 when the parts are interlocked.
The construction of the retainer is, however, materially simplified when made accord-
ing to Figs. 6 and 7, because the interlocking connection between the free ends thereof is omitted. In Fig. 6 the members are straight, so as to lie practically parallel, said members being united by the bight 10 and provided with the lips 11. In Fig. 7 the members are curved and joined by the bight 10; but the lips 11 are provided near the free ends of the members, said free ends being curved inwardly toward each other, as at 21. The construction of the retainers shown by Figs. 6 and 7 depends upon the adherent elasticity of the metal to make the lips remain in engagement with the thread of the bolt.

I desire to call attention to the fact that the lips or spurs are provided on the retainer members practically in the plane of an edge thereof, whereby the lips are positioned to have engagement with the bolt-thread sufficient to make the retainer remain in position on the bolt.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

I claim—

1. The combination with a threaded bolt and a nut therefor, of a nut-lock formed independent of the nut and bolt and comprising a strip of resilient metal having an intermediate bight, inwardly-extending spurs located in opposition to each other in substantially the same vertical plane, and means carried by the strip for moving said spurs out of alinement in the direction of the axis of the bolt, whereby the spurs will be moved into frictional contact with the threads of the bolt as the strip is deflected out of its normal plane during the locking operation.

2. As a new article of manufacture, a nut-lock comprising a single length or strip of resilient metal bent upon itself to form the normally outward-springing members joined at one end by a bight, and one member terminating in an arm extending inwardly into lapping relation to the other member, said arm having a beveled edge and a locking-shoulder in rear of said edge, said other member adapted to be deflected edgewise out of the normal plane of the strip by riding on the beveled edge of the arm, and said member having a shoulder arranged to interlock with said shoulder of the arm on compression of the members into interlocking engagement with a bolt-thread, substantially as described.

In witness whereof I have hereunto set my hand in the presence of two witnesses.

ROBERT PINKERTON McNUTT.

Witnesses:
S. P. BORDEN,
THOMAS HOLLIS.